Nov. 19, 1940. H. M. HUSK 2,222,314
COOKING MACHINE
Filed March 10, 1938 2 Sheets-Sheet 2
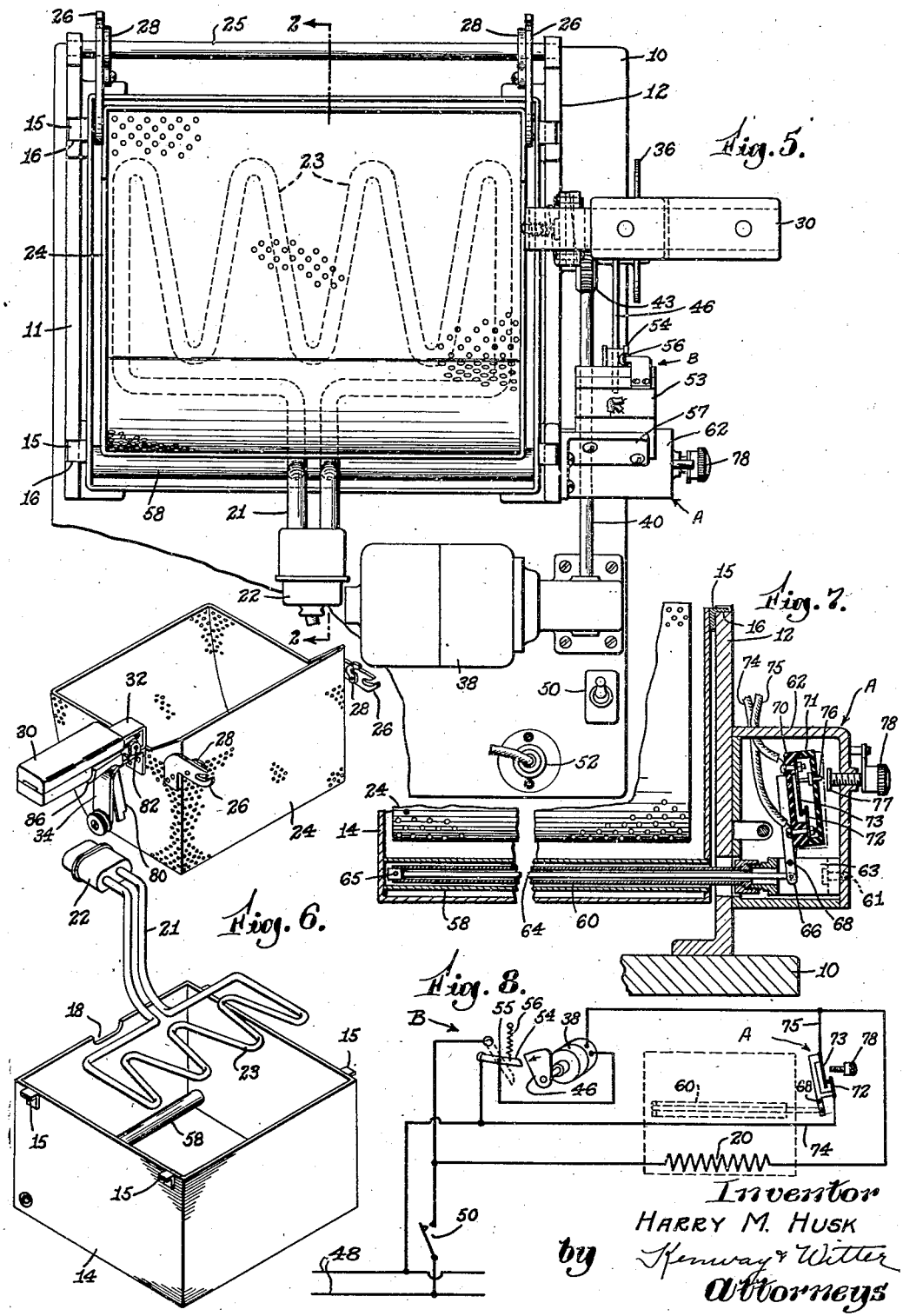
Inventor
HARRY M. HUSK
by Kenway & Witter
Attorneys Patented Nov. 19, 1940

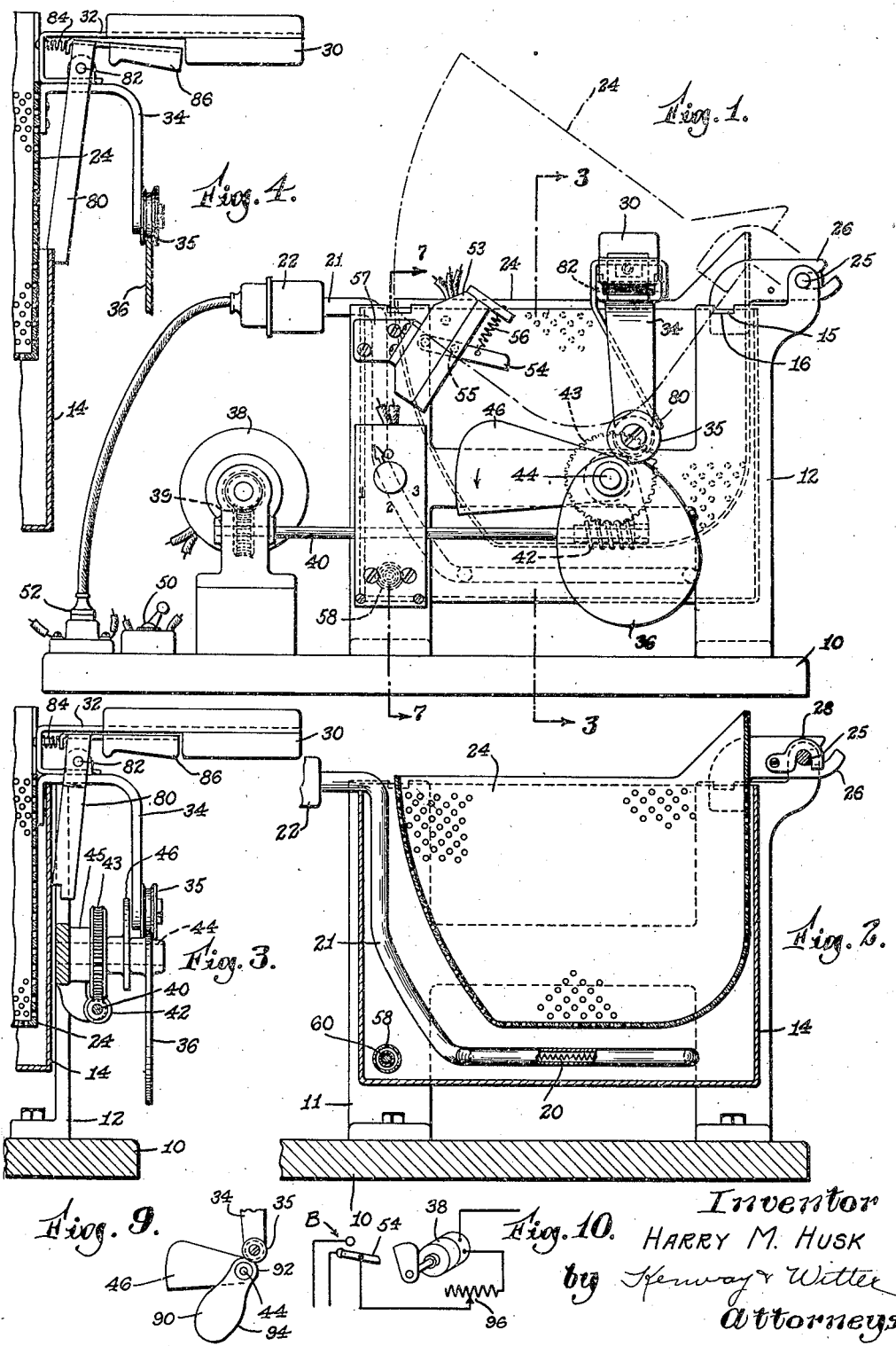

2,222,314

UNITED STATES PATENT OFFICE 2,222,314

COOKING MACHINE

Harry M. Husk, Newburyport, Mass., assignor to Electricooker, Inc., Newburyport, Mass., a corporation of Massachusetts Application March 10, 1938, Serial No. 195,121

11 Claims. (Cl. 53—7)

This invention relates primarily to machines for cooking or frying various materials, usually of an edible nature, such as nut meats, potato chips, etc., in oil or similar cooking liquid, the invention relating more particularly to cooking machines which are semi-automatic to the extent that the product to be cooked or treated is supplied to and removed from the machine manually but wherein the operation of the machine is substantially otherwise automatic.

In Reissue Patent No. 20,570 is disclosed a fully automatic cooking machine more particularly adapted for the cooking of nut meats, this machine employing a hopper and mechanism for automatically removing the cooked product from the cooking medium and delivering measured quantities of the uncooked product from the hopper to the cooking medium following the removal of the cooked product, the machine operating automatically and continuously. The primary object of my invention is to produce a relatively simple and less expensive semi-automatic cooking machine which is constructed to operate and cook in a manner similar to this fully automatic machine.

My invention is concerned more particularly with a home or restaurant cooker into which may be placed and cooked various edibles and which will automatically remove the edibles from the cooking medium when the cooking is completed. The machine includes a container for the cooking liquid, a foraminous basket or other suitable holder for the product to be cooked and an electric heating unit for the cooking liquid, these elements preferably being relatively detachable whereby they can be conveniently washed and cleansed independently. The invention furthermore employs an electric motor and novel connections and controls of a relatively simple nature for lifting and holding the basket and the cooked product from the cooking liquid when the cooking is completed, the basket also preferably being provided with a handle by which the basket and the product may be carried to any desirable location.

These and other features of the invention will become more apparent from the following described embodiment of the invention illustrated in the accompanying drawings and wherein:

Fig. 1 is a front elevation of a cooking machine embodying my invention,

Fig. 2 is a sectional view taken on line 2—2 of Fig. 5,

Fig. 3 is a fragmentary view taken on line 3—3 of Fig. 1,

Fig. 4 is a fragmentary view of the basket latched in the raised position,

Fig. 5 is a plan view of the machine, a portion thereof being broken away,

Fig. 6 is a disassembled view of the container, heater and basket,

Fig. 7 is a fragmentary sectional view taken on line 7—7 of Fig. 1, and

Fig. 8 is a diagram of the electrical connections.

Fig. 9 is a fragmentary view of a modified cam construction.

Fig. 10 is a fragmentary view showing a variable resistor in the motor circuit.

Referring more specifically to the drawings by reference characters, 10 indicates a base or support carrying and including rear and front relatively spaced uprights 11 and 12. A container 14 for the cooking liquid is supported on and between these uprights by means of lugs 15 engaging in notches 16. Resting in a notch 18 in one wall of the container is an electric heating element including a resistance coil 20 within a closed metal tube 21, the two ends of the tube being carried within a connecting plug 22 and the intermediate portion 23 of the tube being adapted to rest on or adjacent to the bottom of the container. A foraminous basket 24 is provided for carrying the product to be cooked, the basket preferably being mounted for pivotal movement on and about a rod 25 secured at its ends to the two uprights 11 and 12 and extending along one top edge of the container. This pivotal connection to the rod comprises two elements 26 carried by the basket and slotted at their free ends to receive the rod, two hooks 28 being pivoted to the elements for securing the basket to the rod. Thus when the hooks 28 are engaged with the rod the basket can only pivot about the rod and when the hooks are disengaged from the rod the basket is freely removable therefrom.

The hooks 28 permit the basket to be removed from the container 14 and the basket is preferably provided with a handle 30 by which the basket and its contents can be carried free of the machine to any location. The handle is attached to the long leg of a U-shaped strap 32 having its short leg affixed to the U-end of a second strap 34. This strap 34 has a short inner leg affixed to the front end wall of the basket and a relatively long and downwardly extending outer leg carrying a roller 35 which cooperates with a basket lifting cam 36 as hereinafter described.

Also mounted on the base 10 is an electric motor 38 having a worm and wormwheel connection at 39 with a shaft 40. The shaft 40 carries a worm 42 in mesh with a wormwheel 43 fixed to a shaft 44. This shaft 44 is carried in a bracket 45 secured to the upright 12 and serving also to support the worm 42. The cam 36 and an adjacent cam 46 are carried on the shaft 44.

The motor 38 and the heating coil 20 receive electric current from a main line 48 and under the control of a main switch 50, a disengageable connection 52 being provided for the heater plug 22. The circuit illustrated in Fig. 8 includes a main switch A and an auxiliary switch B. The main switch is hereinafter more specifically described. The auxiliary switch comprises a bar 54 pivoted at 55, a spring 56 normally holding the bar in the full line position. This switch is mounted in a box 53 supported by a bracket 57 on the upright 12 in such position that the cam 46 is adapted to engage and move the bar 54 to the broken line position, all as hereinafter described.

A tube 58 extends horizontally through the container 14 adjacent to its bottom and has its ends sealed to the opposite side walls of the container thereby supporting the tube, one end of the tube being open to the outside. A thermostat in the form of an expansible tube 60 is inserted into the tube 58 and projects outwardly of its open end, the tube 60 closely fitting the tube 58 whereby to receive heat directly therefrom. Mounted on the outwardly projecting end of the tube 60 is a block 63 and secured to the block by a screw 61 is a casing 62 enclosing the block.

A rod 64 extends freely through the tube 60 and has its inner end connected to the inner end of this tube as by a pin 65. The outer end of the rod is connected to the bottom end of a lever 66 pivoted at 68 to the block 63. The main switch mechanism A is housed within the casing 62, this mechanism including a base 70 carried by the lever 66 and provided with a cover 71. The base 70 is made of insulation material and switch elements 72 and 73 are supported on terminals carried on the base, the element 73 being of spring material and normally in contact with the element 72. Wires 74 and 75 are connected to the said terminals.

Mounted within and projecting outwardly from the cover 71 is a pin 76 having a head limiting outward movement of the pin. The inner end of the pin is arranged to engage the switch element 73. An adjustable stop 77 having an adjusting head 78 on its outer end is extended through and threaded into the casing 62, the inner end of the stop being arranged to be engaged by the pin 76 upon pivotal movement of the switch box 70—71 toward the stop. The construction and arrangement is such that when the tube 60 expands, it causes the rod 64 to be pulled to the left (Fig. 8) thereby swinging the lever 66 on its pivot 68 and moving the switch box to the broken line position of Fig. 7. Such movement causes the pin 76 to engage the stop 77 whereupon the pin is forced inwardly into contact with the switch element 73 and forces this element out of contact with the element 72, thereby breaking the heating circuit through the switch A. It is pointed out that the switch element 73 is preferably of the quick acting type shown and described in Patent No. 1,960,020.

It will be apparent that heat from the liquid within the container 14 is conducted to the expansible tube 60 directly from the tube 58. Expansion of the tube 60 is transmitted to the lever 66 and the leverage resulting from the location of the pivot 68 is such that any slight expansion of the tube 60 causes considerable movement of the switch box and its pin 76, and pressure of the pin against the stop causes the switch element 73 quickly to snap away from contact with the element 72 thereby opening the heating circuit through the switch A. The circuit remains open until cooling and contracting of the tube 60 causes the switch box to return and as the pin leaves the stop 77 the switch element 73 quickly snaps back into contact with the element 72. An index may be provided for cooperating with the adjustable head 78 whereby the temperature at which the switch may be opened may be varied.

In Fig. 1 the basket is shown in broken lines in position raised from the cooking liquid. A latch 80 pivoted to the handle at 82 extends downwardly and is adapted to engage over the top edge of the front wall of the container and hold the basket in this raised position. A spring 84 normally pivots the latch in the latching direction and the latch may be disengaged by pressing a finger release 86 carried by the latch and located beneath the handle grip 30.

The operation of the machine may be briefly described as follows: The cooking liquid is first placed in the container 14 and the main switch 50 is closed, the switches A and B being then in the positions shown in Figs. 7 and 8. In such position the switch A shorts the circuit through the motor and the heating coil 20 is in closed circuit with the line 48 through the switch A. As the liquid becomes heated, the tube 60 expands and when the temperature predetermined by the setting of the stop 77 is reached, the tube has moved the switch box 70—71 on its pivot 68 sufficiently to disengage the contact 73 from the contact 72. The heating circuit through the switch A is thereby opened as is also the short circuiting of the motor. The motor thereupon operates to move the parts in the direction of the arrow from the position illustrated in Fig. 1 to a position wherein the cam 46 engages the bar 54 and moves it to the broken line position of Fig. 8. Such movement opens the motor circuit and the parts thereupon stop with the cam holding this switch in the said broken line position.

The cooking liquid is now at cooking temperature and the operator places the material to be cooked into the basket and lowers the basket into the liquid to a position wherein the basket is supported by contact of the roller 35 with the cam 36, the latch 80 being released by pressing the releasing element 86. This immersion of the product immediately cools the liquid and causes contraction of the tube 60 which thereupon returns the switch A to closed position. The heating coil 20 and the motor circuit are both thereupon placed in circuit with the line 48 and the motor operates in the direction of the arrow until the cam 46 leaves the bar 54 whereupon the spring 56 returns the bar to the full line position of Fig. 8. This movement of the bar opens the motor circuit whereupon the parts stop in the position of Fig. 1. The heating coil 20 continues to provide heat to the liquid which continues to cook the material during the time period necessary to raise the temperature of the liquid and its contents up to the temperature predetermined by the setting of the adjustable head 78. When this temperature is reached, the cooking of the material is completed and at such time the tube 60 has expanded an amount swinging the switch box 70—71 into contact with the stop 77 and separating the switch element 73 from the element 72. This opening of the switch A breaks the short circuiting of the motor whereupon the motor operates the parts from the position of Fig. 1 to said position wherein the cam 46 holds the switch bar 54 in its broken line position. During the first portion of this movement the cam 36 raises the basket from the liquid to the position of Fig. 4 wherein the latch 80 engages over the top edge of the container 14 and holds the basket in its raised position. The parts remain in this position with all circuits open until the cooking liquid is again cooled down to a point permitting the switch A to close.

While it is believed that, in the cooking of most products, the basket and its contents should be raised from the cooking liquid immediately when the liquid reaches the predetermined temperature, as hereinbefore described, it may in some cases be desirable to leave the product in the hot liquid for a predetermined period of time after the liquid has been brought to its maximum temperature and heating by the heating unit has been interrupted. For example, such operation may be desirable when cooking a product which requires a heating period necessitating the setting of the thermostat to a relatively high temperature in order to fully cook the product. In such case, the product may be conveniently and economically cooked by setting the thermostat for a temperature somewhat lower than said high temperature and permitting the product to remain in the hot liquid for a predetermined period of time after the liquid has reached its maximum temperature. My cooking machine described herein is adapted conveniently to be modified electrically and/or mechanically for this purpose, as by the employment of a resistor in the motor circuit or by use of reduced gearing or other mechanical change in the driving connections, thereby combining a time control with a thermostatic control for the purpose stated, the time control being adapted to raise the basket from the cooking liquid a predetermined period of time after the thermostatic control has cut off the heating of the liquid at a predetermined maximum temperature.

In Figs. 9 and 10, I have respectively illustrated mechanical and electrical means for delaying the raising of the basket from the cooking liquid after the liquid has been brought to its maximum temperature and the heating has been interrupted. In Fig. 9, a cam 90 has been substituted for the cam 36 on the shaft 44, the contour of this cam 90 including a substantially concentric portion 92 and a quick acting portion 94 for cooperating with the roller 35. The result is that the shaft has a considerable rotation from the position of Fig. 9 before it effects raising of the basket and it then raises the basket much more rapidly than does the cam 36. The shaft 44 is rotated at a relatively slow speed from the motor 38 through the reduction gearing 39—43 and this speed may be further reduced through manipulation of the variable resistor 96 in the motor circuit. It will be apparent that the mechanical and electrical means may be used either independently or in combination to effect the desired speed of shaft 44 and leave the basket and its contents in the hot cooking liquid for a desired predetermined period after the heating operation has been interrupted.

Having thus described my invention, what I claim as new and desire to secure by Letters Patent of the United States is:

1. In a cooking machine, a container for a cooking liquid, a foraminous basket within the container, power driven means outside the container for raising the basket from the container, and a latch for holding the basket in its raised position.

2. In a cooking machine, a container for a cooking liquid, a foraminous basket within the container, means supporting the basket relative to the container for movement upwardly and outwardly of the container, an arm rigid with the basket and extending outwardly of the container, a power driven cam for engaging the arm and raising the basket from the container, and a handle carried by the basket, the said means being detachable thereby permitting the basket to be lifted by its handle from the container.

3. In a cooking machine, a container for a cooking liquid, a foraminous basket within the container, means supporting the basket relative to the container for movement upwardly and outwardly of the container, power driven means for raising the basket from the container, a latch for holding the basket in its raised position, and a handle carried by the basket, the first named means permitting the basket to be lifted by its handle from the container.

4. In a cooking machine, a container for a cooking liquid, a foraminous basket within the container, power driven means for raising the basket from the container, a latch for holding the basket in raised position, a handle carried by the basket, and means associated with the handle for releasing the latch.

5. In a cooking machine, a container for a cooking liquid, a foraminous basket within the container, means supporting the basket relative to the container for pivotal movement upwardly about an axis located adjacent to the top edge of a side wall of the container, power driven means for pivoting the basket upwardly about said axis, a latch for holding the basket in its raised position, and a handle carried by the basket, the first named means being detachable thereby permitting the basket to be lifted by its handle from the container.

6. In a cooking machine, a container for a cooking liquid, a foraminous basket within the container, an electric motor, a shaft driven by the motor, means driven by the shaft for raising the basket from the container, a latch for holding the basket in its raised position, a normally closed switch in the motor circuit, and a cam on the shaft for opening the switch after the said means has raised the basket.

7. In a cooking machine, a container for a cooking liquid, a foraminous basket within the container, an arm rigid with the basket and extending outwardly over the top edge of the container and downwardly outside of and adjacent to one wall of the container, a shaft adjacent to the lower end of the arm, an electric motor for driving the shaft, two relatively adjacent cams on the shaft and adjacent to said wall, one of said cams cooperating with the arm to raise the basket from the container, a normally closed switch in the motor circuit, and means so arranged relative to the other cam that said other cam opens the switch after the first cam has raised the basket.

8. In a cooking machine, a container for a cooking liquid, a foraminous basket within the container, electric heating means for heating liquid within the container, an electric motor, basket lifting means driven by the motor and including an element extending upwardly exteriorly along a side wall of the container and over the top of said wall and having connection with the basket for raising the basket to an elevated position within the container when the liquid reaches a predetermined temperature, and a releasable latch for holding the basket in its raised position.

9. In a cooking machine, a container for a cooking liquid, a foraminous basket within the container, an arm rigid with the basket and extending outwardly over the top edge of the container and downwardly outside the container, a power driven cam adjacent to the container and below the top edge thereof cooperating with the downwardly extending extremity of the arm for raising the basket from the container, means supporting the basket relative to the container for movement upwardly and outwardly of the container, and a handle carried by the basket, the said means being readily detachable thereby permitting the basket to be lifted from the container and machine by the handle.

10. In a cooking machine, a container for a cooking liquid, a foraminous basket within the container, a carrying handle carried by the basket, means for supporting and guiding the basket for movement to and from cooking liquid in the container and permitting the basket to be lifted freely from the container by the handle and carried from the container and machine, means including a motor cooperating with the first-named means for lifting the basket from the liquid in the container, and means for causing the motor automatically thus to operate after a predetermined cooking of a product in the basket and liquid.

11. In a cooking machine, a container for a cooking liquid, a foraminous basket within the container, a carrying handle carried by the basket and projecting laterally outward therefrom, a supporting element rigid with the basket, means cooperating with the element for supporting the basket in the container and lifting it from the container, and means for causing the first-named means automatically thus to lift the basket after a predetermined cooking of a product in the basket and liquid, the first-named means and element cooperating to permit the basket to be lifted freely from the container by the handle and carried from the container and machine.

HARRY M. HUSK.